United States Patent Office 2,895,640
Patented July 21, 1959

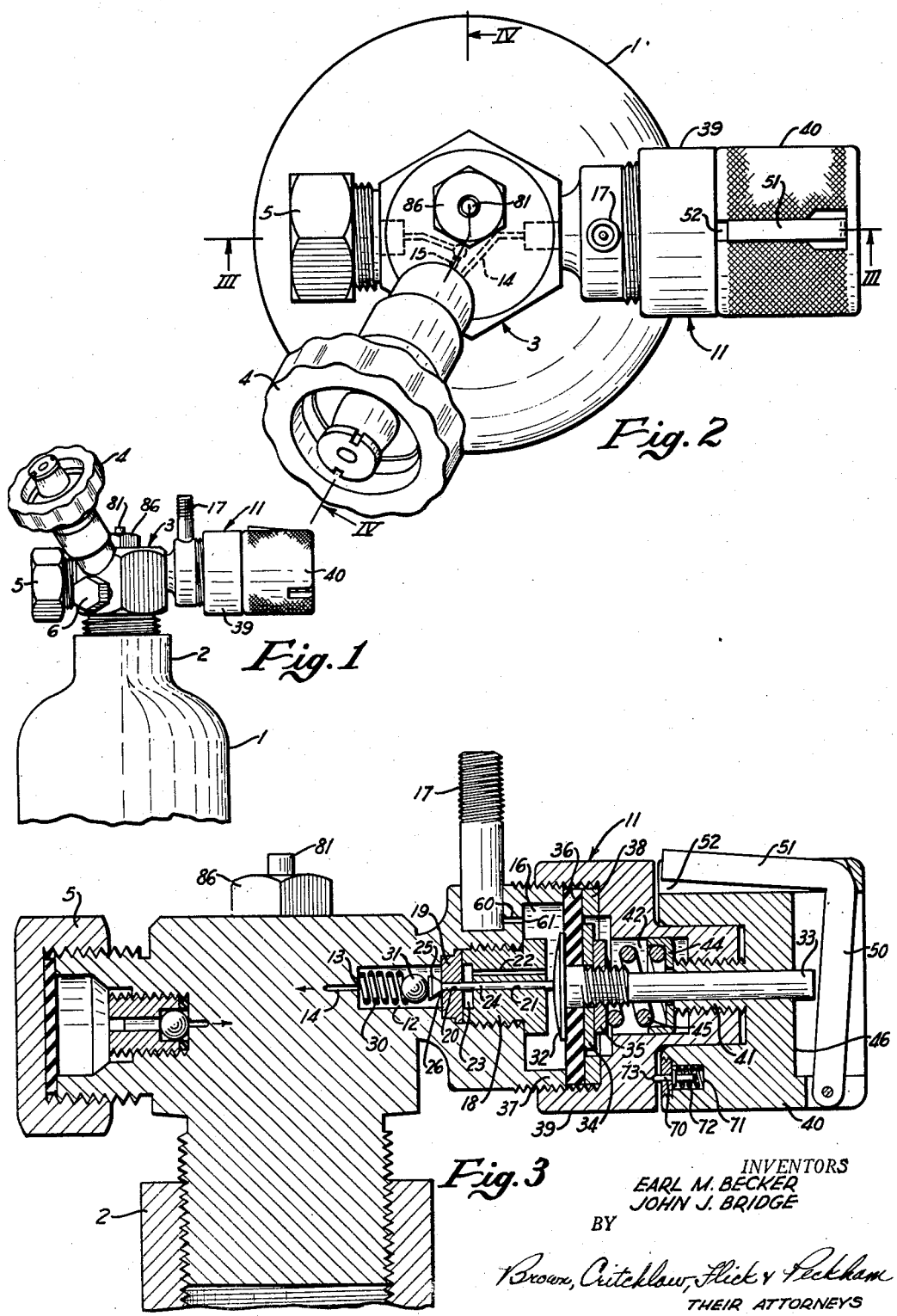

---

2,895,640

GAS DISPENSING APPARATUS

Earl M. Becker, Pittsburgh, and John J. Bridge, Turtle Creek, Pa., assignors to Mine Safety Appliances Company, Pittsburgh, Pa., a corporation of Pennsylvania Application February 17, 1955, Serial No. 488,818

15 Claims. (Cl. 222—3)

This invention relates to gas dispensing apparatus and, more particularly, to apparatus to be used under conditions of poor visibility for dispensing a gas at low pressure from a high pressure container. While the invention will be specifically described in connection with an oxygen dispenser for breathing apparatus carried by an underwater swimmer or diver, it is to be understood that it is equally applicable to dispensing oxygen or other gases under other conditions of poor visibility.

In dispensing oxygen for breathing purposes from a high pressure cylinder, it has been the practice to provide the cylinder with a dispensing unit having a flow regulating valve for obtaining the required metered flow of low pressure oxygen for normal breathing as well as an emergency flow during critical periods. It has also been the practice for the dispensing unit to have a pressure gauge on the inlet side of the valve for visually indicating the pressure, and hence the quantity, of oxygen remaining in the cylinder at any given time. When such apparatus is used under conditions of poor visibility, as, for example, by an underwater diver doing salvage work, the diver may not have sufficient time to, or be physically capable of, turning the hand wheel the necessary number of turns to obtain the required extra flow of oxygen during emergencies. Similarly, the visual pressure gauge for measuring the residual oxygen in the cylinder may be useless because of poor visibility, so that the oxygen pressure in the cylinder may decrease, without the user's knowledge, to a point where he is left without a sufficient supply to carry him to safety. In addition, visual pressure gauges often give erroneous readings and are susceptible to breakage and, when used under water, to leakage.

It is accordingly among the objects of this invention to provide an improved dispensing unit for supplying oxygen, or other gas, at a reduced pressure and at predetermined rates of flow from a supply of the gas held under pressure in a cylinder, in which the desired rate of flow can be selected by tactile discrimination on the part of the user, in which the valve means used to obtain a given rate of flow at low pressure will be positive and simple in operation, in which provision is made for instantly obtaining an emergency rate of flow greater than the normal rate, and in which indicating means are provided that will permit the user by his sense of touch to determine the pressure of the gas remaining in the cylinder, and particularly to indicate a minimum pressure that will serve as a warning that the supply of compressed gas is nearing exhaustion.

Other objects will be apparent from the following description of the invention in connection with the attached drawings, in which Fig. 1 is an elevation of the dispensing unit mounted on a cylinder of compressed gas;

Fig. 2 is a plan view, somewhat enlarged, of the apparatus in Fig. 1;

Fig. 3 is a cross-section, still further enlarged, of the dispensing unit along the line III—III of Fig. 2.

Figure 4:
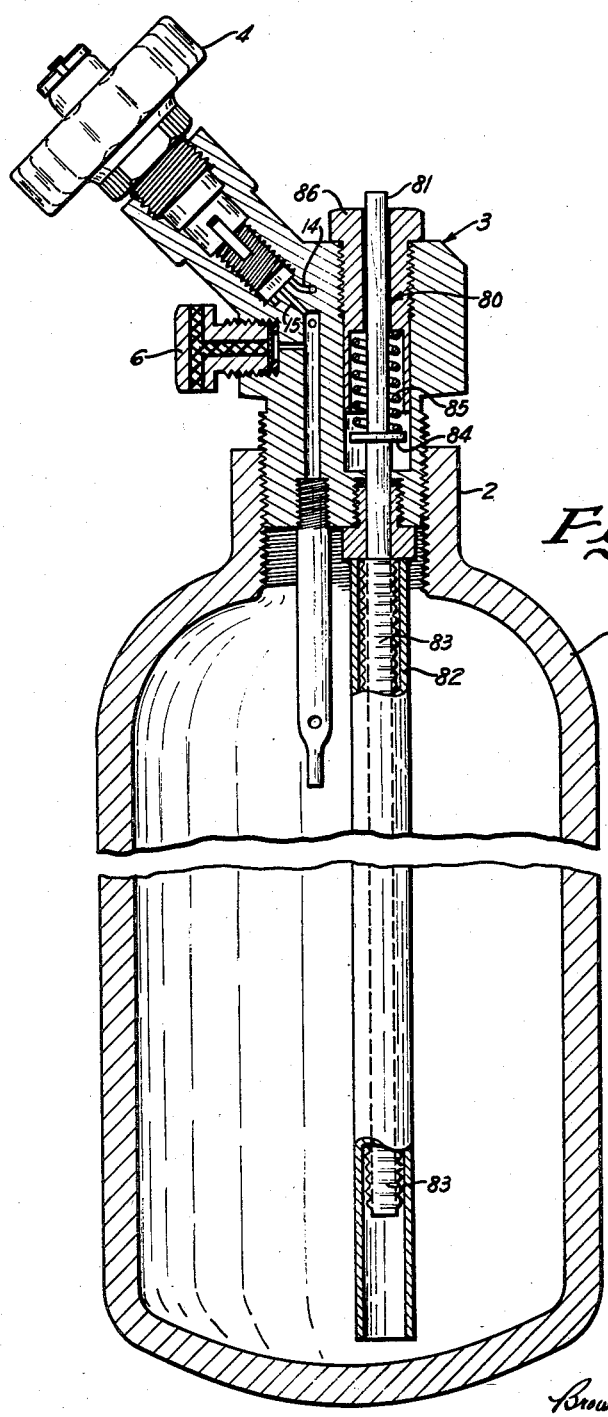
Fig. 4 is a cross-section of the dispensing unit and cylinder along the line IV—IV of Fig. 2.

The dispensing unit, in accordance with this invention, is threadably mounted in the neck of a flask or cylinder of high pressure gas and is provided with a pressure reducing and flow regulating valve that can be tactilely adjusted for delivering predetermined rates of flow including an emergency rate of flow. This valve includes a high pressure chamber provided with an inlet communicating with the high pressure gas in the cylinder, and a low pressure chamber having an outlet for the low pressure gas. A passage between the two chambers is normally closed by a valve head engaging a valve seat at the high pressure end of the passage. A pressure regulating means responsive to changes of pressure in the low pressure chamber is adapted to open the valve when the pressure in that chamber falls below a predetermined amount and to close it when it rises above that amount. Provision is made for manually setting the pressure regulating means in various positions corresponding to predetermined rates of flow, including an emergency lever overriding other settings to deliver instantly an emergency flow of gas in critical periods. The dispensing unit also includes a feeler gauge for measuring the pressure of gas within the cylinder. This gauge includes a sleeve extending through the dispensing unit into the cylinder and sealed by an expansible bellows. A feeler rod is slidably received within the sleeve, with spring means urging the lower end of the rod against the bottom of the bellows. The upper end of the rod normally projects outside the top of the unit, except when the pressure within the cylinder falls below a predetermined minimum; and the extent of its projection is proportional to the gas pressure inside the cylinder.

Referring to the drawings, a cylinder 1 is charged with a gas, such as oxygen, under high pressure. The neck 2 of the cylinder is internally threaded to receive a dispensing unit, which is generally designated by the numeral 3. This unit is provided with certain conventional fittings, including a main shut-off valve 4, a charging chuck 5, and a fusable safety plug 6, which form no part of the present invention and need not be further described.

The dispensing unit also includes a pressure reducing and flow regulating valve 11. The valve itself (see Fig. 3) comprises a high pressure chamber 12, provided with an inlet 13 communicating with the interior of the cylinder through a passage 14 and main shut-off valve 4 and a passage 15 (see Figs. 2 and 4). The valve also has a low pressure chamber 16, having an outlet 17 for attaching a hose (not shown) to conduct the oxygen to breathing equipment. Between the low and high pressure chambers is a threaded plug 18, and a valve seat member 19 on the high pressure side of the plug. The valve seat member is preferably made of moulded plastic, but may be of other suitable material; and its outer edge is held in tight sealing engagement between the plug and the end of the high pressure chamber. The valve seat and plug members are, respectively, provided with axial passages 20 and 21, the plug having an additional passage 22 parallel to passage 20 and extending between the low pressure chamber and an intermediate pressure chamber 23. The latter chamber is located between the plug and the valve seat member, and is conveniently formed by a counterbore in the plug. Through the passages 20 and 21 extends a valve stem 24, having a valve head 25 attached to the end of the stem adjacent the high pressure chamber. The valve head is adapted to close the valve seat 26 at the end of passage 20; and it is normally held in its closed position by a coil spring 30 and a ball 31, which is urged by the spring against the valve head.

It will be noted that the valve stem extends through passage 21 into the low passure chamber 16, where the end of the stem is adapted to abut against the head 32 of an actuating rod 33. This rod is secured by a washer 34 and a nut 35 to a diaphragm 36, which is made of flexible, gas-impervious material and forms an end wall of the low pressure chamber. The outer edge of the diaphragm is held in sealing engagement with the end portion 37 of the dispensing unit by a washer 38 mounted in a fitting 39 that is threadably secured to the portion 37. Threadably mounted on the fitting 39 is a pressure regulating knob 40, having its central threaded portion 41 extending into the hollow interior 42 of the fitting 39. The inner end of this threaded portion 41 engages a spring retaining washer 44, which supports a compression spring 45 extending around the actuating rod between the bearing washer and the diaphragm. The outer end of the actuating rod 33 passes through the center of the regulating knob 40, which slidably receives it, and projects slightly beyond the end surface 46 of that knob. It will be apparent that the knob 40, through the spring 45, is adapted to apply an adjustable pressure on the diaphragm 36, tending to flex the diaphragm inwardly to the left (looking at Fig. 3). Pivotally mounted on the outer edge of the adjusting knob is an emergency lever 50, having a bent portion 51 normally projecting from a slotted recess 52 on the side of the knob. The lever is normally held in its open or released position by the actuating rod 33; and when the free end of that lever is depressed, the actuating rod is moved to the left.

The operation of the pressure regulating valve is as follows: When the main shut-off valve 4 is opened, high pressure gas from the cylinder enters the high pressure chamber through the inlet passage 14. So long as valve 25 is closed, the gas cannot go beyond the high pressure chamber. By turning the pressure regulating knob 40 to move the bearing washer 44 to the left, and thereby increase the pressure of the spring 45 against the diaphragm, the latter is flexed inwardly to the left causing the head 32 of the actuating rod 33 to press against the end of the valve stem 24 and open the valve 25. Because of the conical shape of the valve head 25 and its substantially linear seat at the end of passage 20, only a slight unseating movement is required to open that valve to its fullest extent, particularly since the passage 20, partially obstructed as it is by the valve stem 24, offers only a restricted orifice for the flow of gas out of the high pressure chamber.

With a given clearance between the valve stem 24 and the side wall of the passage 20, it will be apparent that the rate of gas flow through passage 20 of the valve seat member, and thereafter through passages 21 and 22 in the plug 18, will vary with the pressure of gas in the high pressure chamber 12, i.e., with the pressure of the gas in the cylinder. In other words, the rate at which gas will enter the low pressure chamber 16 for a given opening of the valve 25 will depend on the pressure of the gas in the high pressure chamber 12. Now, the outlet 17 is connected to the low pressure chamber by a passage 60, which is provided with an orifice 61 having a cross sectional area that is preferably of such size that gas will flow out of the low pressure chamber 16 through the outlet 17 at the same or at a slightly lesser rate than it normally comes into that chamber, through passages 21 and 22. In the low pressure chamber, the pressure is always limited by the action of the pressure responsive diaphragm 36. As the pressure builds up, the diaphragm will be forced outwardly (to the right in Fig. 3) against the pressure of the spring 45 until the valve 25 either closes entirely or is so nearly closed that the flow of gas therethrough is throttled to a point where it is flowing out of the low pressure chamber at the same rate it is flowing into it. When valve 25 is completely closed by the movement of the diaphragm, and the pressure of its own spring 30, it will remain closed until the gas in the low pressure chamber has been reduced in pressure to the point at which the diaphragm will have moved under the urging of spring 45 to reopen valve 25. In either case, the flow of gas through outlet 17 can be maintained at a predetermined rate that is controlled by the setting of the regulating knob 40 and the resulting compressive force exerted by spring 45 against the diaphragm. The greater the force exerted by the spring against the diaphragm, the greater will be the pressure in the low pressure chamber and, in consequence, the greater will be the flow of gas to the outlet 17.

By selecting a spring 45 of suitable size, a very small adjustment of the regulating knob 40, in fact, less than one revolution of that knob, will vary the rate of flow of gas through the outlet 17 over a wide range. This feature makes it possible to index various settings of the regulating knob, so that it can be set under conditions of poor visibility, by sense of touch alone, to give predetermined rates of flow. Such indexing is accomplished by providing frictional stops for various positions of the knob. These stops can take the form of a small pin 70 projecting from but slidably retained within a hole 71 in the bottom face of the knob in contact with the fitting 39. A spring 72 within the hole urges the pin outward to engage circumferentially spaced indentations 73 on the opposing surface of fitting 39. It may be suitably provided that in one of the indexed positions of the knob, the valve 25 will be completely closed, and in other indexed positions (within one complete revolution) various metered rates of flow can be selected within the desired range.

When, for any reason, it is desired to have a greater flow of oxygen, as in emergencies, such flow can be obtained by manually pressing the free end of the emergency lever 50 into the slotted recess on the side of the regulating knob, thereby forcing the actuating rod 33 to the left (as seen in Fig. 3) to open valve 25, regardless of the setting of the knob. It will be apparent that the emergency lever provides means for instantaneously obtaining an emergency flow of oxygen, overriding any previous setting of the regulating knob.

Referring to Fig. 4 the dispensing unit is additionally provided with a feeler gauge for determining, by sense of touch alone, the pressure (and therefore the quantity) of gas remaining in the cylinder. This gauge, which is generally designated by the numeral 80, includes a gauge rod 81 that is slidably received within the dispensing unit and also in a tube 82 that extends below that unit into the cylinder 1. The top of the tube is treadably mounted in the base of the dispensing unit. The inside of the tube is hermetically sealed by an expansible or bellows seal 83 extending from the top to near the bottom of the tube. The feeler gauge rod 81 is received within this bellows, the lower end of the rod resting on the bottom of the bellows, and is adapted to rise and fall therewith in response to even slight changes of pressure within the cylinder. Adjacent its upper end, the gauge rod is provided with a collar 84, serving as a support for a compression spring 85, which surrounds the rod between the collar and the screw plug 86. The latter is threaded into the top of the dispensing unit and has an axial hole through which the upper end of the feeler gauge rod extends. As will be apparent from Fig. 4, the gas pressure within the cylinder tends to force the upper end of the feeler gauge rod beyond the top of the screw plug 86, against the urging of the spring 85. The more the rod projects above the screw, the greater is the indicated pressure of gas within the cylinder. Preferably, feeler gauge rod 81 is of such a length that its upper end will project beyond the dispensing unit, except when the pressure within the cylinder falls below a predetermined minimum. At this minimum or at low pressures, the end of the rod will be flush with or below the top of the unit. In this way, a person using the cylinder for breathing purposes can determine, by sense of touch alone, whether the quantity of gas remaining in the cylinder is above a predetermined safe minimum, and can estimate the amount by which the pressure exceeds that minimum by the distance the feeler gauge rod projects beyond the top of the dispensing unit.

It will be apparent that an underwater swimmer or diver, by using the dispenser herein described, can tactilely control the rate of flow of oxygen for breathing purposes within a wide range. In addition, this invention will permit the user to obtain instantaneously a large supply of oxygen for use in emergencies, as well as to determine, by the sense of touch alone, whether or not there is a safe reserve of gas within the cylinder.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. Apparatus for dispensing gas at low pressure from a container of high pressure gas, comprising a high pressure chamber for receiving high pressure gas from the container, a low pressure chamber provided with an outlet, a gas passage connecting the two chambers, valve means controlling the flow of gas through the passage, the cross-sectional areas of the passage and the outlet being so proportioned that when the valve means are fully opened gas will flow through the passage into the low pressure chamber at least as fast as it flows out of that chamber through the outlet, flow regulating means responsive to changes of pressure in the low pressure chamber and operative to open the valve when that pressure falls below and to close the valve when that pressure rises above a predetermined pressure, and pressure indicating means including a dispensing head secured to the top of the container, a feeler rod slidably received within the head and extending therethrough with its inner end subjected to the pressure of gas within the container and its outer end adapted to project outside the head when that pressure is above a predetermined minimum, spring means urging the feeler rod against the pressure of gas in the container, sealing means to prevent the escape of gas from the container around the rod.

2. Apparatus for dispensing gas at low pressure from a container of high pressure gas, comprising a high pressure chamber for receiving high pressure gas from the container, a low pressure chamber provided with an outlet, a gas passage connecting the two chambers, valve means controlling the flow of gas through the passage, the cross-sectional areas of the passage and the outlet being so proportioned that when the valve means are fully opened gas will flow through the gas passage into the low pressure chamber at least as fast as it flows out of that chamber through the outlet, flow regulating means responsive to changes of pressure in the low pressure chamber and operative to open the valve when that pressure falls below and to close the valve when that pressure rises above a predetermined pressure, and pressure indicating means including a sleeve having its inner end exposed to the high pressure gas in the container, sealing means secured to the sleeve and expandable axially thereof to close the inner end of the sleeve, a feeler rod slidably received within the sleeve, having its inner end engaging the expandable sealing means and its outer end adapted to extend beyond the sleeve and to project outside the apparatus, and spring means urging the inner end of the feeler rod against the expandable sealing means to resist axial movement thereof caused by the pressure of gas in the container, whereby variations in the gas pressure within the container will cause the feeler rod to project varying amounts outside of the apparatus.

3. Apparatus in accordance with claim 2, in which said sealing means is an expandable bellows tube closed at one end that is received within the sleeve and has its open end secured to the sleeve.

4. Apparatus for dispensing gas at low pressure from a container of high pressure gas, comprising a high pressure chamber for receiving high pressure gas from the container, a low pressure chamber provided with an outlet, a passage connecting the container and the low pressure chamber, a valve head in the high pressure chamber adapted to close one end of the passage, a valve stem extending from the valve head completely through the passage with its free end in the low pressure chamber, spring means urging the valve head into its closed position, the cross-sectional areas of the passage and the outlet being so proportioned that when the valve means are fully opened gas will flow through the gas passage into the low pressure chamber at least as fast as it flows out of the chamber through the outlet, a flexible diaphragm mounted in the low pressure chamber and having its inner side only subjected to the pressure of gas in that chamber and being adapted when flexed inwardly a predetermined amount to cause the free end of the valve stem to move axially to open the valve, a second spring means urging the diaphragm to flex inwardly against the gas pressure in said chamber, thereby to open the valve when the pressure in the low pressure chamber falls below a predetermined amount, and manually operable means for instantly and positively flexing the diaphragm inwardly to fully open the valve irrespective of the gas pressure in the low pressure chamber.

5. Apparatus in accordance with claim 4, in which the manually operable means comprises a pivoted lever and a rod disposed with one end engageable by the lever and the other end engageable with the diaphragm.

6. Apparatus for dispensing gas at low pressure from a container of high pressure gas, comprising means for reducing the pressure of gas withdrawn from the container, regulating means for adjusting the rate of flow of the resulting low pressure gas to a predetermined rate, means for automatically maintaining said predetermined rate of flow irrespective of variations in pressure of the high pressure gas within the container, and tactile pressure indicating means including a dispensing head secured to the top of the container, a feeler rod slidably received within the head with its inner end subjected to the pressure of the high pressure gas, spring means urging the feeler rod against said gas pressure, the outer end of the feeler rod being adapted to project outside the head when said gas pressure is above a predetermined minimum, and sealing means to prevent the escape of gas around the rod.

7. Apparatus in accordance with claim 6, in which the regulating means for adjusting the rate of flow of the low pressure gas includes a rotatable knob provided with a plurality of frictional stops for indexing the angular setting of the knob.

8. Apparatus in accordance with claim 6, in which the tactile pressure indicating means includes a dispensing head secured to the container, a sleeve extending through the head into the container, flexible sealing means secured to the sleeve to prevent the escape of gas therethrough, the sealing means being expandable and contractable axially of the sleeve in response to variations of gas pressure in the container, a feeler rod slidably received within the sleeve and movable axially thereof in response to axial movements of the sealing means, and spring means urging one end of the feeler rod against the sealing means to resist axial movement thereof in response to an increase in gas pressure, the other end of the feeler rod projecting outside the dispensing head when the gas pressure in the container is above a predetermined pressure.

9. Apparatus for dispensing gas at low pressure from a container of high pressure gas, comprising a low pressure chamber provided with an outlet orifice, a passage connecting the container and the low pressure chamber, the passage having a cross-sectional area at least equal to the cross-sectional area of the outlet orifice, valve means adapted to close one end of the passage with a portion of said means extending into the low pressure chamber, a flexible diaphragm mounted in the low pressure chamber and adapted when the pressure in that chamber falls below a predetermined amount to flex inwardly to open the valve means and adapted when the pressure in that chamber rises above a predetermined amount to flex outwardly to close the valve means, spring means urging the diaphragm to flex inwardly, and a rotatable knob for varying the force applied by the spring means the knob provided with a plurality of frictional stops for indexing its angular setting.

10. Pressure indicating means for a container of high pressure gas, comprising a sleeve extending into the container and secured thereto, positive sleeve sealing means in the form of an axially expandible metal bellows tube received within the sleeve and having its outer end secured to the inside of the sleeve and having its inner end closed and free to move within the sleeve, a feeler gauge rod partially received within the bellows tube and having its inner end engaging the closed end of that tube, the outer portion of the rod being slidably supported in the container with the outer end of the rod adapted to project outside the container, and spring means engaging the rod and urging it inwardly against the pressure of gas in the container.

11. Pressure indicating means for a container of high pressure gas, comprising a feeler gauge rod, means for slidably supporting the rod with its inner end subjected to the pressure of gas in the container and its outer end adapted to project outside the container, positive sealing means in the form of an axially expandible metal bellows tube, the outer end of the tube being secured to the container and the inner end of the tube being closed and extending inside the container, the feeler rod having its inner portion received within the bellows tube and having its inner end engaging the closed end of that tube, and spring means engaging the rod and urging it inwardly against the pressure of gas in the container.

12. In apparatus for dispensing gas from a container of high pressure gas having a pressure regulating device that includes a low pressure chamber and a gas passage connecting that chamber with the container and valve means responsive to pressure variations in the chamber for closing the passage when that pressure exceeds a predetermined amount: flow regulating means for obtaining a given flow of gas through the chamber corresponding to a given pressure therein, said means comprising a gas outlet in the chamber having an orifice with a cross-sectional area that does not exceed the cross-sectional area of the passage between the chamber and the container, and manually operable means for instantly and positively opening the valve means irrespective of the pressure in the chamber, said manually operable means including a pivoted lever and a rod having one end engageable by the lever and the other end operatively engageable with the valve means.

13. In apparatus for dispensing gas from a container of high pressure gas having a pressure regulating device that includes a low pressure chamber and a gas passage connecting that chamber with the container and valve means responsive to pressure variations in the chamber for closing the passage when that pressure exceeds a predetermined amount: flow regulating means for obtaining a given flow of gas through the chamber corresponding to a given pressure therein, said means comprising a gas outlet in the chamber having an orifice with a cross-sectional area that does not exceed the cross-sectional area of the passage between the chamber and the container, and regulating means for adjusting the gas pressure in the low pressure chamber and hence the rate of flow of gas through the outlet, said regulating means comprising a manually rotatable knob threadably supported and operatively connected to the valve means, the knob being provided with a plurality of frictional stops for indexing the angular setting of the knob.

14. Apparatus for dispensing gas at low pressure from a container of high pressure gas, comprising a low pressure chamber provided with an outlet orifice, a passage connecting the container and the low pressure chamber, the passage having a cross-sectional area at least equal to the cross-sectional area of the outlet orifice, valve means adapted to close one end of the passage with a portion of said means extending into the low pressure chamber, a flexible diaphragm mounted in the low pressure chamber and adapted when the pressure in that chamber falls below a predetermined amount to flex inwardly to open the valve means and adapted when the pressure in that chamber rises above a predetermined amount to flex outwardly to close the valve means, spring means urging the diaphragm to flex inwardly, a rotatable knob for varying the force applied by the spring means, the knob being provided with a plurality of frictional stops for indexing its angular setting, and manually operable means for instantly and positively opening the valve means irrespective of the pressure in the low pressure chamber, said last means including a pivoted lever and a rod having one end engageable by the lever and the other end engageable with the diaphragm for flexing the diaphragm inwardly.

15. Apparatus in accordance with claim 14, in which the lever is pivoted within the rotatable knob and the free end of the lever protrudes from the side of the knob and in which the rod is positioned axially of the knob and slidably received therein.

References Cited in the file of this patent

UNITED STATES PATENTS

| | | |
|---|---|---|
| 119,455 | Dunbar | Oct. 3, 1871 |
| 956,283 | Cash | Apr. 28, 1910 |
| 1,564,644 | Taylor | Dec. 8, 1925 |
| 1,659,263 | Harris | Feb. 14, 1928 |
| 1,750,978 | Webb | Mar. 18, 1930 |
| 2,002,883 | Deming | May 28, 1935 |
| 2,695,731 | Anderson | Nov. 30, 1954 |